US012620341B2

(12) United States Patent
Woo et al.

(10) Patent No.: US 12,620,341 B2
(45) Date of Patent: May 5, 2026

(54) PIXEL, METHOD FOR DRIVING THE SAME, AND DISPLAY DEVICE INCLUDING THE SAME

(71) Applicant: Samsung Display Co., LTD., Yongin-si (KR)

(72) Inventors: Min Kyu Woo, Yongin-si (KR); Bon Yong Koo, Yongin-si (KR); Hyun Joon Kim, Yongin-si (KR); Seon Young Choi, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/509,743

(22) Filed: Nov. 15, 2023

(65) Prior Publication Data

US 2024/0249668 A1 Jul. 25, 2024

(30) Foreign Application Priority Data

Jan. 20, 2023 (KR) ........................ 10-2023-0008605

(51) Int. Cl.
*G09G 3/32* (2016.01)

(52) U.S. Cl.
CPC ....... *G09G 3/32* (2013.01); *G09G 2300/0426* (2013.01); *G09G 2300/0852* (2013.01); *G09G 2300/0861* (2013.01)

(58) Field of Classification Search
CPC ............. G09G 3/32; G09G 2300/0426; G09G 2300/0852; G09G 2300/0861; G09G 3/3233; G09G 3/2014; G09G 3/2011; G09G 3/3266; H04N 25/00
USPC .................................................... 345/82, 204
See application file for complete search history.

(56) References Cited

U.S. PATENT DOCUMENTS

| | | | | |
|---|---|---|---|---|
| 9,779,657 | B2 | 10/2017 | Kim et al. | |
| 11,837,156 | B2 | 12/2023 | Hwang et al. | |
| 2005/0212783 | A1* | 9/2005 | Kasai | G09G 3/2011 345/204 |
| 2015/0042692 | A1* | 2/2015 | Kim | G09G 3/3233 345/82 |
| 2019/0197987 | A1* | 6/2019 | Kim | H04N 25/00 |

(Continued)

FOREIGN PATENT DOCUMENTS

| | | |
|---|---|---|
| CN | 114241976 | 3/2022 |
| CN | 114399974 | 4/2022 |

(Continued)

*Primary Examiner* — Abdul-Samad A Adediran
(74) *Attorney, Agent, or Firm* — CANTOR COLBURN LLP

(57) ABSTRACT

A pixel according to an embodiment of the disclosure includes a light emitting element, a pulse width control circuit that is electrically connected to a data line to which a data voltage is applied, generates an emission control signal having a pulse width depending on the data voltage, and outputs the emission control signal, and a pixel driving circuit that receives the emission control signal and supplies a driving current to the light emitting element for a period according to the pulse width of the emission control signal. According to an embodiment of the disclosure, a pixel displaying images of various grayscales by controlling a period in which the light emitting element emits light, a method for driving the same, and a display device including the same may be provided.

18 Claims, 10 Drawing Sheets

(56) References Cited

U.S. PATENT DOCUMENTS

| | | | | |
|---|---|---|---|---|
| 2019/0221159 | A1* | 7/2019 | Jeong | G09G 3/3266 |
| 2021/0210003 | A1* | 7/2021 | Kim | G09G 3/2014 |

FOREIGN PATENT DOCUMENTS

| | | |
|---|---|---|
| CN | 115995204 | 4/2023 |
| KR | 10-2072795 | 2/2020 |
| KR | 10-2022-0045501 | 4/2022 |

* cited by examiner

PIXEL, METHOD FOR DRIVING THE SAME, AND DISPLAY DEVICE INCLUDING THE SAME

CROSS REFERENCE TO RELATED APPLICATION(S)

This application claims priority to and benefits of Korean Patent Application No. 10-2023-0008605 under 35 U.S.C. § 119, filed on Jan. 20, 2023, in the Korean Intellectual Property Office (KIPO), the entire contents of which are incorporated herein by reference.

BACKGROUND

1. Technical Field

Embodiments of the disclosure relate to a pixel, a method for driving the same, and a display device including the same.

2. Description of the Related Art

As information technology develops, the importance of a display device, which is a connection medium between a user and information, has been emphasized. In response to this, the use of a non-light emitting type display device such as a liquid crystal display device and the like and a light emitting type display device such as an organic light emitting display device and the like has been increasing.

The light emitting type display device may include multiple pixels including one or more light emitting elements. The light emitting type display device may display images of various grayscales by varying a magnitude of a driving current flowing through a light emitting element.

However, in case that the display device is used for a long time, a grayscale of an image displayed by a pixel may change due to a change in characteristics of a transistor for supplying the driving current to the light emitting element. This may appear as a phenomenon in which color coordinates preset in the display device are distorted.

Accordingly, there is a demand for introducing pixels and display devices displaying images of various grayscales without varying the magnitude of the driving current supplied to the light emitting element.

SUMMARY

The disclosure provides a pixel displaying images of various grayscales by controlling a length of a period in which a light emitting element emits light, a method for driving the same, and a display device including the same.

A pixel according to an embodiment of the disclosure may include a light emitting element, a pulse width control circuit that is electrically connected to a data line to which a data voltage is applied, generates an emission control signal having a pulse width depending on the data voltage, and outputs the emission control signal, and a pixel driving circuit that receives the emission control signal and supplies a driving current to the light emitting element for a period according to the pulse width of the emission control signal.

The pulse width control circuit may include a first capacitor including a first electrode to which the data voltage is applied and a second electrode to which a triangular wave is applied.

The pulse width control circuit may further include a first switching element that switches an electrical connection between the first electrode of the first capacitor and the data line.

The pulse width control circuit may further include a second switching element including a gate electrode electrically connected to the first electrode of the first capacitor, a source electrode, and a drain electrode. The gate electrode of the second switching element may be electrically connected to the first electrode of the first capacitor and the first switching element at a first node. One of the source electrode and the drain electrode of the second switching element may be electrically connected to a first power source line to which a first power source voltage is applied. Another one of the source electrode and the drain electrode of the second switching element may be electrically connected to a second power source line to which a second power source voltage is applied.

The pulse width control circuit may further include a third switching element that switches an electrical connection between the first power source line and the second switching element.

The second switching element and the third switching element may be electrically connected at a second node. The emission control signal may be output through the second node.

The pulse width control circuit may further include a second capacitor including an electrode electrically connected to the second node.

The emission control signal may have a high level voltage or a low level voltage. One of the high level voltage and the low level voltage may be a voltage of the first power source line. Another one of the high level voltage and the low level voltage may be a voltage of the second power source line.

The light emitting element may be electrically connected to a third power source line. The pixel driving circuit may include a first emission control switching element including a gate electrode to which the emission control signal is input and switching an electrical connection between the first power source line and a fourth node, a fourth switching element including a gate electrode electrically connected to a third node, a source electrode, and a drain electrode, and a fifth switching element that switches an electrical connection between the fourth node and a fourth power source line. One of the source electrode and the drain electrode of the fourth switching element may be electrically connected to the fourth node, and another one of the source electrode and the drain electrode of the fourth switching element may be electrically connected to a fifth node.

The pixel driving circuit may further include a second emission control switching element that switches an electrical connection between the fifth node and the light emitting element.

The pixel driving circuit may further include a storage capacitor including an electrode electrically connected to the third node and another electrode electrically connected to the first power source line.

The pixel driving circuit may further include a first initialization switching element that switches an electrical connection between the third node and a second power source line to which a second power source voltage is applied. The gate electrode of the first emission control transistor may be electrically connected to the second power source line through the pulse width control circuit.

The driving current flowing through the light emitting element may flow from a first power source line to which a first power source voltage is applied to the light emitting element via the pixel driving circuit. A high level voltage of the emission control signal may be a voltage applied from the first power source line to the pixel driving circuit via the pulse width control circuit.

A display device according to an embodiment of the disclosure may include a display panel on which a plurality of pixels including a light emitting element and a plurality of data lines electrically connected to the plurality of pixels are disposed; and a data driving circuit that supplies a data voltage to the plurality of data lines. Each of the plurality of pixels may emit light for a period according to the data voltage.

The display device may further include a timing controller that outputs an input image data to the data driving circuit. The input image data may include grayscale information for the each of the plurality of pixels, and the data driving circuit may output the data voltage having a voltage level corresponding to the grayscale information. The each of the plurality of pixels may emit light for a period according to the grayscale information included in the input image data.

A plurality of first scan lines may be disposed on the display panel, and each of the plurality of first scan lines may be electrically connected to ones of the plurality of pixels located in a same pixel row. The ones of the plurality of pixels located in the same pixel row may have different start timings or different end timings of emitting light depending on the data voltage.

The display device may further include a triangular wave output circuit outputting a first voltage or a triangular wave that increases linearly from the first voltage. At least one sweep line to which the triangular wave is applied may be disposed on the display panel, and the at least one sweep line may be electrically connected to the plurality of pixels. A period during which the data voltage is input to the plurality of pixels electrically connected to the at least one sweep line may overlap a period during which the triangular wave output circuit outputs the first voltage. A period during which the plurality of pixels electrically connected to the at least one sweep line emit light may overlap a period during which the triangular wave output circuit outputs the triangular wave.

According to an embodiment of the disclosure, a method for driving a pixel including a light emitting element may include inputting a data voltage to the pixel, generating an emission control signal having a pulse width corresponding to the data voltage in the pixel, and emitting light from the light emitting element for a period corresponding to the pulse width of the emission control signal.

The method for driving a pixel may further include inputting a triangular wave to the pixel through a sweep line electrically connected to the pixel. The emitting of the light from the light emitting element may be performed during the inputting of the triangular wave to the pixel.

The method for driving a pixel may further include inputting a first voltage to the sweep line. The inputting of the data voltage may be performed during the inputting of the first voltage.

BRIEF DESCRIPTION OF THE DRAWINGS

The accompanying drawings, which are included to provide a further understanding of the disclosure, and are incorporated in and constitute a part of this specification, illustrate embodiments of the disclosure, and, together with the description, serve to explain principles of the disclosure.

DETAILED DESCRIPTION OF THE EMBODIMENTS

Figure 1:
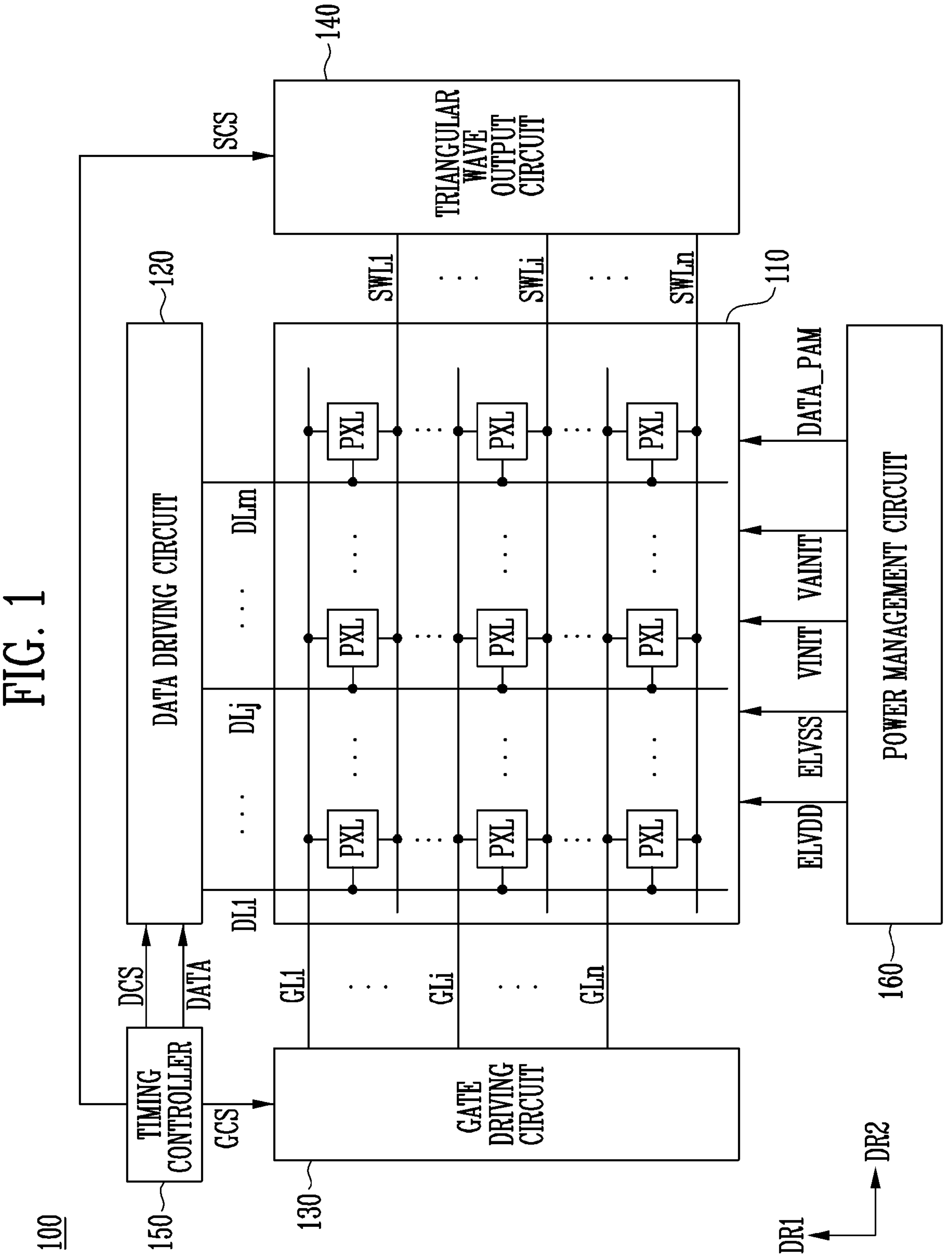
FIG. 1 is a schematic system block diagram of a display device according to an embodiment of the disclosure.

In the following description, for the purposes of explanation, numerous specific details are set forth in order to provide a thorough understanding of various embodiments or implementations of the disclosure. As used herein "embodiments" and "implementations" are interchangeable words that are non-limiting examples of devices or methods disclosed herein.

It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

Hereinafter, various embodiments of the disclosure will be described in detail with reference to the accompanying drawings so that those of ordinary skill in the art may readily implement the disclosure. The disclosure may be embodied in various different forms and is not limited to the embodiments described herein.

In order to clearly describe the disclosure, parts that are not related to the description are omitted, and the same or similar components are denoted by the same reference numerals throughout the specification. Therefore, the reference numerals described above may also be used in other drawings.

Unless otherwise specified, the illustrated embodiments are to be understood as providing example features of the disclosure. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the disclosure.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

In addition, the size and thickness of each component shown in the drawings are arbitrarily shown for convenience of description, and thus the disclosure is not necessarily limited to those shown in the drawings. In the drawings, thicknesses may be exaggerated to clearly express the layers and regions.

In addition, in the description, the expression “is the same” may mean “substantially the same”. That is, it may be the same enough to convince those of ordinary skill in the art to be the same. In other expressions, “substantially” may be omitted.

Although the terms “first,” “second,” etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as “lower,” “above,” “upper,” “over,” “higher,” “side” (e.g., as in “sidewall”), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as “below” or “beneath” other elements or features would then be oriented “above” the other elements or features. Thus, the example term “below” can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, “a,” “an,” and “the” are intended to include the plural forms as well, unless the context clearly indicates otherwise. Moreover, the terms “comprises,” “comprising,” “includes,” and/or “including,” when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms “substantially,” “about,” and other similar terms, are used as terms of approximation and not as terms of degree, and, as such, are utilized to account for inherent deviations in measured, calculated, and/or provided values that would be recognized by one of ordinary skill in the art.

When an element, such as a layer, is referred to as being “on,” “connected to,” or “coupled to” another element or layer, it may be directly on, connected to, or coupled to the other element or layer or intervening elements or layers may be present. When, however, an element or layer is referred to as being “directly on,” “directly connected to,” or “directly coupled to” another element or layer, there are no intervening elements or layers present. To this end, the term “connected” may refer to physical, electrical, and/or fluid connection, with or without intervening elements.

Further, the first direction DR1, the second direction DR2, and the third direction DR3 are not limited to three axes of a rectangular coordinate system, such as the x, y, and z axes, and may be interpreted in a broader sense. For example, the first direction DR1, the second direction DR2, and the third direction DR3 may be perpendicular to one another, or may represent different directions that are not perpendicular to one another. For the purposes of this disclosure, “at least one of X, Y, and Z” and “at least one selected from the group consisting of X, Y, and Z” may be construed as X only, Y only, Z only, or any combination of two or more of X, Y, and Z, such as, for instance, XYZ, XYY, YZ, and ZZ. In the specification and the claims, the term “and/or” is intended to include any combination of the terms “and” and “or” for the purpose of its meaning and interpretation. For example, “A and/or B” may be understood to mean “A, B, or A and B.” The terms “and” and “or” may be used in the conjunctive or disjunctive sense and may be understood to be equivalent to “and/or.”

The display surface may be parallel to a surface defined by a first direction DR1 and a second direction DR2. A normal direction of the display surface, i.e., a thickness direction of the display device DD, may indicate a third direction DR3. In this specification, an expression of “when viewed from a plane or on a plane” or “in a plan view” may represent a case when viewed in the third direction DR3. Hereinafter, a front surface (or a top surface) and a rear surface (or a bottom surface) of each of layers or units may be distinguished by the third direction DR3. However, directions indicated by the first to third directions DR1, DR2, and DR3 may be a relative concept, and converted with respect to each other, e.g., converted into opposite directions.

Unless otherwise defined or implied herein, all terms (including technical and scientific terms) used have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification.

FIG. 1 is a schematic system block diagram of a display device 100 according to an embodiment of the disclosure.

The display device 100 according to an embodiment of the disclosure may include a display panel 110, a data driving circuit 120, a gate driving circuit 130, a triangular wave output circuit 140, a timing controller 150, a power management circuit 160, and the like.

Multiple pixels PXL may be disposed on the display panel 110. Each of the pixels PXL may include one or more light emitting elements. In case that each of the pixels PXL includes one or more light emitting elements, the display device 100 may be implemented as a light emitting type display device.

In case that the display device 100 is implemented as a light emitting type display device, the display device 100 may be implemented as an inorganic light emitting display device. The display device 100 may be a curved display device, a flexible display device, a foldable display device, a rollable display device, a stretchable display device, a transparent display device, a mirror display device, or the like. The display device 100 may be implemented as, for example, a display device including an inorganic light emitting element having a nano-scale size to micro-scale size. The display device 100 may be implemented as an organic light emitting display device including an organic light emitting element. The display device 100 according to an embodiment of the disclosure is not limited thereto.

Multiple data lines DL1 to DLm (where m may be a natural number greater than or equal to 2), gate lines GL1 to GLn (where n may be a natural number greater than or equal to 2), and sweep lines SWL1 to SWLn (where n may be a natural number greater than or equal to 2) electrically connected to the pixels PXL may be disposed on the display panel 110. Multiple power source lines may be disposed on the display panel 110 to transfer power source voltages to be applied to the pixels PXL. One of a first power source voltage ELVDD, a second power source voltage VINIT, a third power source voltage ELVSS, a fourth power source voltage DATA_PAM, and a fifth power source voltage VAINIT may be applied to one of the power source lines disposed on the display panel 110.

The data lines DL1 to DLm may be disposed on the display panel 110 extending in a first direction DR1. For example, the first direction DR1 may be a direction connecting upper and lower sides of the display panel 110. The first direction DR1 may be, for example, a column direction.

The gate lines GL1 to GLn may be disposed on the display panel 110 extending in a second direction DR2. A second direction DR2 and the first direction DR1 may be different. For example, the second direction DR2 may intersect the first direction DR1. The second direction DR2 may be, for example, a direction connecting left and right sides of the display panel 110. The second direction DR2 may be, for example, a row direction. However, directions indicated by the first direction DR1 and the second direction DR2 are not limited to the above description.

Referring to FIG. 1, the sweep lines SWL1 to SWLn may be disposed on the display panel 110 extending in the second direction DR2. However, as will be described below with reference to FIG. 2B, in case that the display device 100 according to an embodiment of the disclosure operates in a non-sequential driving method, the sweep lines SWL1 to SWLn may extend in a direction different from the second direction DR2 (for example, the first direction DR1).

The power source lines may be disposed on the display panel 110 extending in the first direction DR1.

The data driving circuit 120 may output a data voltage to the data lines DL1 to DLm. The data driving circuit 120 may generate the data voltage for displaying an image and output the generated data voltage to the data lines DL1 to DLm. The data driving circuit 120 may receive input image data DATA and a data driving circuit control signal DCS from the timing controller 150 to generate the data voltage, and output the generated data voltage to the data lines DL1 to DLm according to timing.

The data driving circuit control signal DCS may include a data enable signal, a vertical synchronization signal, a horizontal synchronization signal, and the like.

The gate driving circuit 130 may output a gate driving signal to the gate lines GL1 to GLn. The gate driving circuit 130 may output a gate voltage of a turn-on level or a turn-off level to the gate lines GL1 to GLn. The gate driving signal may include a turn-on level gate voltage and a turn-off level gate voltage. Operation timing of switching elements in a pixel PXL may be controlled by the gate driving signal. The gate driving circuit 130 may receive a gate driving circuit control signal GCS from the timing controller 150 and output the gate driving signal (or the gate voltage of the turn-on level or the turn-on level gate voltage) to the gate lines GL1 to GLn according to timing. The gate driving circuit 130 may sequentially output the gate driving signal to the gate lines GL1 to GLn, but the disclosure is not limited thereto.

The triangular wave output circuit 140 may drive the sweep lines SWL1 to SWLn. The triangular wave output circuit 140 may output a triangular wave to the sweep lines SWL1 to SWLn. The triangular wave may include a signal whose voltage level changes linearly with time. In the disclosure, the triangular wave may also be referred to as a sweep signal SWEEP. The triangular wave output circuit 140 may generate a triangular wave, and the triangular wave output circuit 140 may output the generated triangular wave to the sweep lines SWL1 to SWLn. The triangular wave output circuit 140 may sequentially output the generated triangular wave to the sweep lines SWL1 to SWLn, but the disclosure is not limited thereto. The triangular wave output circuit 140 may receive a triangular wave output circuit control signal SCS from the timing controller 150 to generate the triangular wave and output the generated triangular wave to the sweep lines SWL1 to SWLn.

The timing controller 150 may control the data driving circuit 120, the gate driving circuit 130, and the triangular wave output circuit 140. The timing controller 150 may receive image data from outside (for example, a host system, etc.) and convert the input image data according to an interface (or a pre-set interface). The timing controller 150 may transmit the input image data DATA converted according to the interface to the data driving circuit 120.

The interface may include, for example, Low Voltage Differential Signal Interface (LVDS), Serial Peripheral Interface (SPI), Inter-Integrated Circuit (I2C), or embedded Display Port (eDP).

The timing controller 150 may generate the input image data DATA in consideration of an arrangement of the pixels PXL disposed on the display panel 110. For example, the timing controller 150 may receive RGB type image data, convert the RGB type image data into RGBG type input image data DATA, and transmit the converted input image data (e.g., the converted RGBG type input image data DATA) to the data driving circuit 120.

The power management circuit 160 may generate multiple power source voltages to be supplied to the display panel 110 and output the generated power source voltages. The power source voltages may be voltages commonly input to the pixels PXL.

The data driving circuit 120, the gate driving circuit 130, the triangular wave output circuit 140, and the timing controller 150 may be classified according to a function performed by each component within the display device 100, and two or more of the components may be formed as a single integrated circuit. For example, the data driving circuit 120 and the timing controller 150 may be integrally formed as a single integrated circuit and disposed in the display device 100. The gate driving circuit 130 and the triangular wave output circuit 140 may be integrally formed as a single integrated circuit and disposed in the display device 100.

The timing controller 150 may be formed as an integrated circuit and disposed in the display device 100. The timing controller 150 may be implemented as a processor, logic, or the like and disposed in the display device 100. The timing controller 150 may include one or more registers.

Figure 2A:
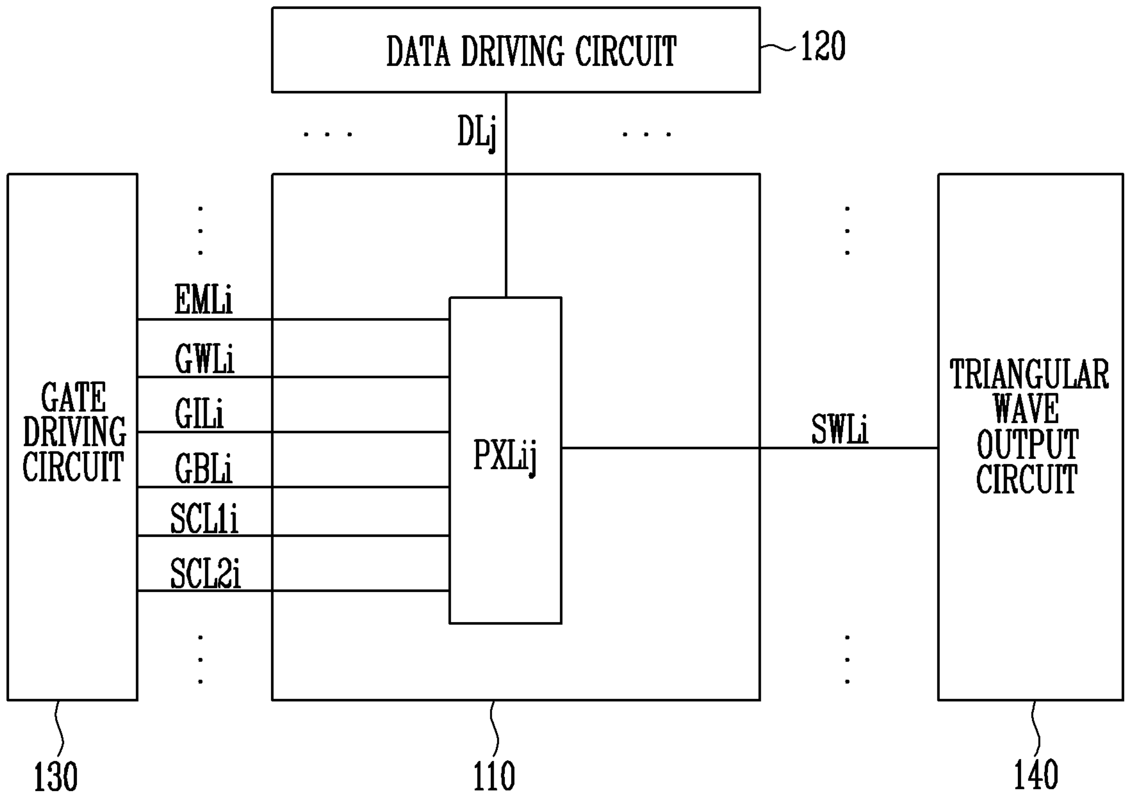
FIG. 2A is a schematic diagram illustrating a driving circuit of a pixel in a display device displaying an image in a sequential emission method.
Figure 2B:
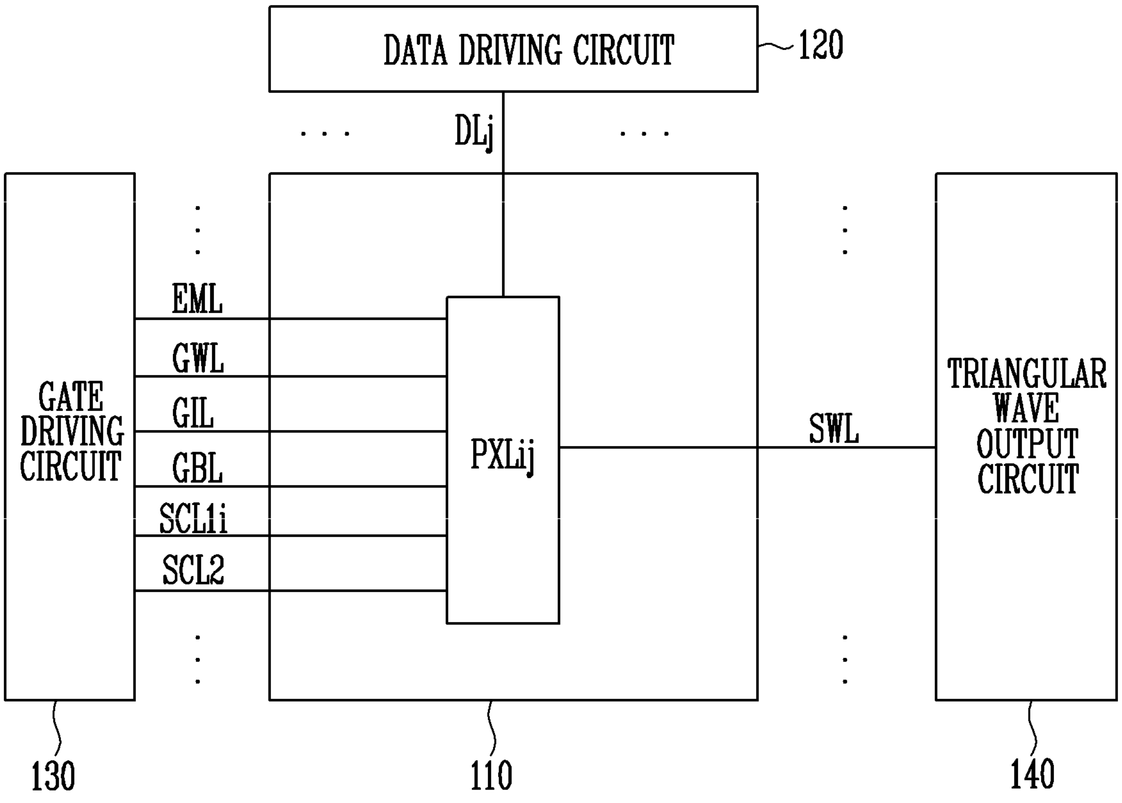
FIG. 2B is a schematic diagram illustrating a driving circuit of a pixel in a display device displaying an image in a non-sequential emission method.

FIG. 2A is a schematic diagram illustrating a driving circuit of a pixel PXLij in a display device 100 displaying an image in a sequential emission method. FIG. 2B is a schematic diagram illustrating a driving circuit of a pixel PXLij in a display device 100 displaying an image in a non-sequential emission method.

Referring to FIGS. 2A and 2B, a pixel PXLij (hereinafter referred to as pixel PXLij) may be located in an i-th row (1≤i≤n, where n may be a natural number greater than or equal to 2) and a j-th column (1≤j≤m, where m may be a natural number greater than or equal to 2) in the display panel 110.

Referring to FIG. 2A, a pixel PXLij of a display device 100 displaying an image in a sequential driving method (or progressive emission method) is shown. For example, the gate driving circuit 130 may sequentially output the gate driving signal to from a first gate line GL1 (see, e.g., FIG. 1) to an n-th gate line GLn (see, e.g., FIG. 1). For example, the triangular wave output circuit 140 may sequentially output the triangular wave to from a first sweep line SWL1 (see, e.g., FIG. 1) to an n-th sweep line SWLn (see, e.g., FIG. 1).

An i-th gate line GLi (see, e.g., FIG. 1) may be electrically connected to the pixel PXLij. The i-th gate line GLi may include an i-th first scan line SCL1*i*, an i-th second scan line SCL2*i*, an i-th third scan line GWLi, an i-th fourth scan line GILi, an i-th fifth scan line GBLi, and an i-th first emission control line EMLi.

The i-th first scan line SCL1*i* may be a line to which a gate signal (or a gate voltage of a turn-on level) is applied so that the data voltage applied to the data line DLj is input to the pixel PXLij.

The second scan line SCL2*i*, the third scan line GWLi, the fourth scan line GILi, the fifth scan line GBLi, and the first emission control line EMLi will be described below.

An i-th sweep line SWLi may be electrically connected to the pixel PXLij.

The gate driving signal (for example, the gate voltage of the turn-on level or the turn-on level gate voltage) and the triangular wave may be input to pixels PXL (see, e.g., FIG. 1) located in a same pixel row (for example, an i-th pixel row) at substantially a same timing. The gate driving signal and the triangular wave may be input to pixels PXL (see, e.g., FIG. 1) located in different pixel rows at different timings.

Referring to FIG. 2B, a pixel PXLij of a display device 100 displaying an image in a non-sequential driving method is shown. The non-sequential driving method may include a simultaneous emission method.

In the disclosure, the simultaneous emission method may refer to "a method in which pixels PXL (see, e.g., FIG. 1) located in different pixel rows start emitting light at a same time" or "a method in which pixels PXL (see, e.g., FIG. 1) located in different pixel rows end emitting light at a same time".

Referring to FIG. 2B, an i-th gate line GLi (see, e.g., FIG. 1) may be electrically connected to the pixel PXLij. The i-th gate line GLi may include an i-th first scan line SCL1*i*, an i-th second scan line SCL2, an i-th third scan line GWL, an i-th fourth scan line GIL, an i-th fifth scan line GBL, an i-th emission control line EML, and the like.

At least one of the i-th second scan line SCL2, the i-th third scan line GWL, the i-th fourth scan line GIL, the i-th fifth scan line GBL, and the i-th emission control line EML may be a common line commonly connected to two or more pixel rows. The i-th second scan line SCL2 may be a common second scan line SCL2. The i-th third scan line GWL may be a common third scan line GWL. The i-th fourth scan line GIL may be a common fourth scan line GIL. The i-th fifth scan line GBL may be a common fifth scan line GBL. The i-th emission control line EML may be a common emission control line EML.

An i-th sweep line SWL may be electrically connected to the pixel PXLij. The i-th sweep line SWL may be commonly connected to two or more pixel rows. The i-th sweep line SWL may be a common sweep line SWL.

Referring to FIG. 2A, the display device 100 according to an embodiment of the disclosure may display an image in a sequential driving method. According to the sequential driving method, a period for displaying an image for each pixel row may be controlled. According to the sequential driving method, a period during which the pixel PXLij emits light within one frame period may be increased.

Referring to FIG. 2B, the display device 100 according to an embodiment of the disclosure may display an image in a non-sequential driving method. According to the non-sequential driving method, pixels PXL (see, e.g., FIG. 1) located in different pixel rows may start emitting light at the same time or may end emitting light at the same time. According to the non-sequential driving method, the gate driving circuit 130 may be simple.

Hereinafter, the i-th first scan line SCL1*i* may be referred to as a first scan line SCL1, the i-th second scan line SCL2*i* or SCL2 may be referred to as a second scan line SCL2, the i-th third scan line GWLi or GWL may be referred to as a third scan line GWL, the i-th fourth scan line GILi or GIL may be referred to as a fourth scan line GIL, the i-th fifth scan line GBLi or GBL may be referred to as a fifth scan line GBL, the i-th first emission control line EMLi or EML may be referred to as a first emission control line EML, the i-th sweep line SWLi or SWL may be referred to as a sweep line SWL, and the j-th data line DLj or DL may be referred to as a data line DL.

According to an embodiment of the disclosure, the display device 100 may display an image in at least one of a sequential driving method and a non-sequential driving method.

Figure 3:
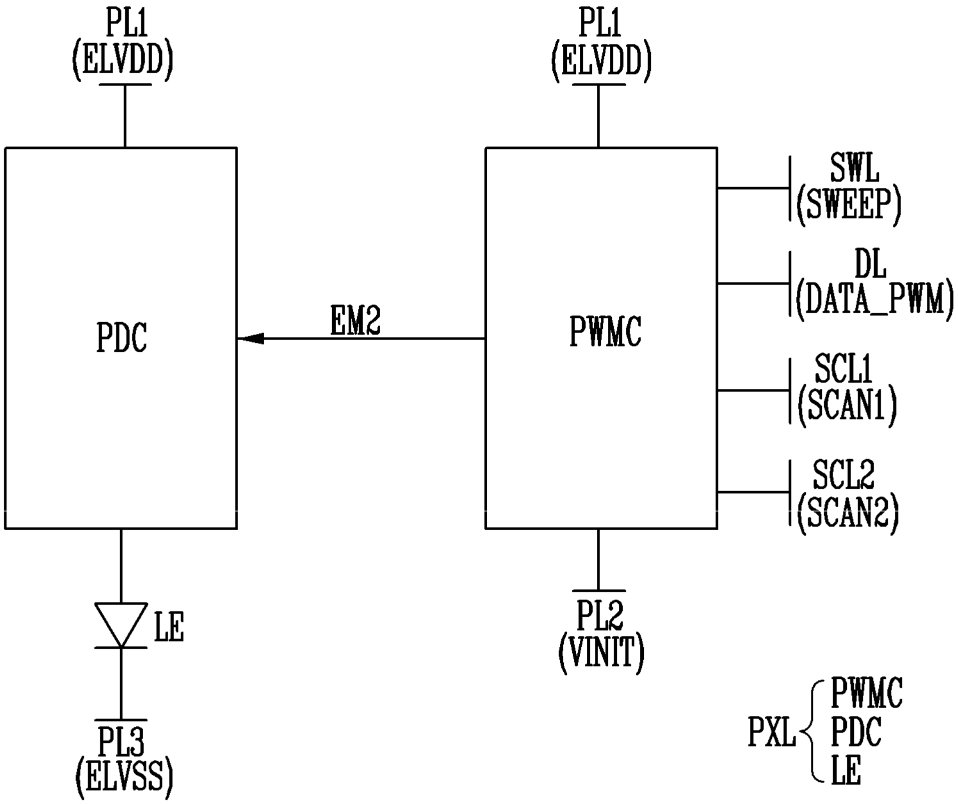
FIG. 3 is a schematic system block diagram of a pixel according to an embodiment of the disclosure.

FIG. 3 is a schematic system block diagram of a pixel PXL according to an embodiment of the disclosure.

Referring to FIG. 3, the pixel PXL according to an embodiment of the disclosure may include a pulse width control circuit PWMC, a pixel driving circuit PDC, and a light emitting element LE.

The pulse width control circuit PWMC may generate and output a second emission control signal EM2. The pulse width control circuit PWMC may be electrically connected to a data line DL and control the pulse width (or a duty ratio) of the second emission control signal EM2 based on the input data voltage.

The pulse width control circuit PWMC may be electrically connected to the sweep line SWL, the data line DL, the first scan line SCL1, and the second scan line SCL2. The pulse width of the second emission control signal EM2 may be controlled in the pulse width control circuit PWMC by signals supplied to the lines (e.g., the sweep line SWL, the data line DL, the first scan line SCL1, the second scan line SCL2, and the like).

The pulse width control circuit PWMC may be electrically connected to a power source line to which a high level voltage is applied and a power source line to which a low level voltage is applied. For example, the pulse width control circuit PWMC may be electrically connected to a first power source line PL1 to which the first power source voltage ELVDD is applied. A high level voltage of the second emission control signal EM2 may be equal to or substantially equal to the first power source voltage ELVDD.

For example, the pulse width control circuit PWMC may be electrically connected to a second power source line PL2 to which the second power source voltage VINIT is applied. A low level voltage of the second emission control signal EM2 may be equal to or substantially equal to the second power source voltage VINIT.

The pixel driving circuit PDC may be electrically connected to the first power source line PL1. The pixel driving circuit PDC may receive the first power source voltage ELVDD and supply a driving current to the light emitting element LE. The pixel driving circuit PDC may receive the second emission control signal EM2 and control a period during which the driving current is supplied to the light emitting element LE according to the pulse width of the input second emission control signal EM2.

The light emitting element LE may include an electrode electrically connected to the pixel driving circuit PDC and another electrode electrically connected to a third power source line PL3. The third power source voltage ELVSS may be applied to the third power source line PL3. The third power source voltage ELVSS may be, for example, a ground voltage. The light emitting element LE may emit light in case that the driving current flows, and may not emit light in case that the driving current does not flow.

In the pixel PXL according to an embodiment of the disclosure, a grayscale of a corresponding pixel PXL may be adjusted according to a period in which the light emitting element LE emits light within one frame period.

For example, in case that the period in which the light emitting element LE emits light within one frame period is long, the corresponding pixel PXL may display a high grayscale image. For example, in case that the period in which the light emitting element LE emits light within one frame period is short, the corresponding pixel PXL may display a low grayscale image.

In the pixel PXL according to an embodiment of the disclosure, a magnitude of the driving current flowing through the light emitting element LE may be constant regardless of the grayscale displayed by the corresponding pixel PXL.

Figure 4:
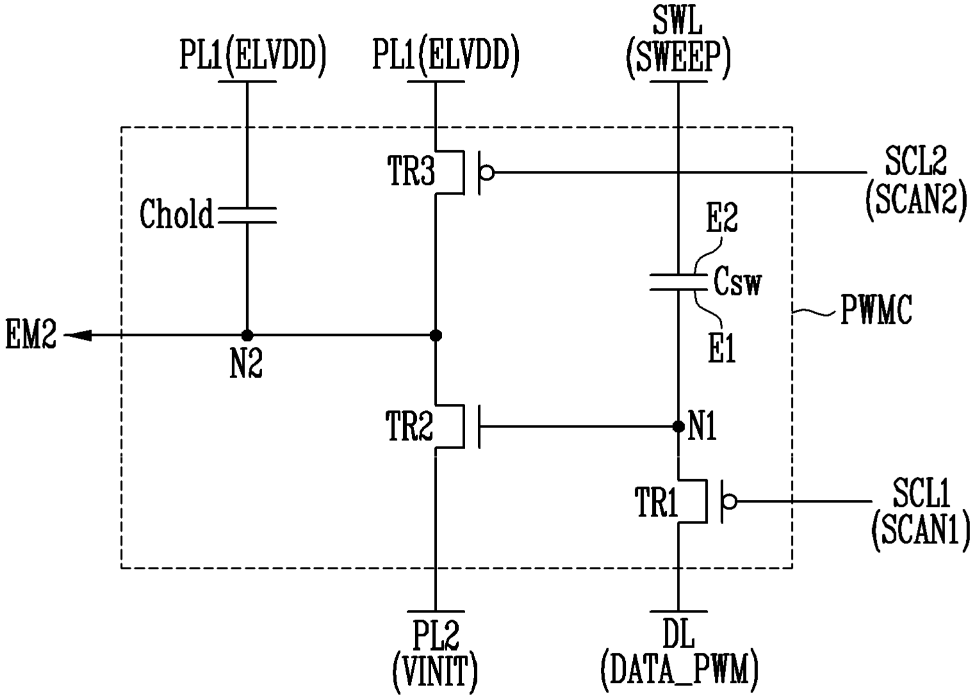
FIG. 4 is a schematic diagram illustrating an equivalent of a pulse width control circuit according to an embodiment of the disclosure.

FIG. 4 is a schematic diagram illustrating and equivalent of a pulse width control circuit PWMC according to an embodiment of the disclosure.

The pulse width control circuit PWMC may include one or more switching elements and one or more capacitors.

The switching element may include a transistor. The transistor may be implemented as a p-type thin film transistor including a p-type semiconductor or an n-type thin film transistor including an n-type semiconductor. In a p-type thin film transistor, a turn-on level voltage may be a low level voltage and a turn-off level voltage may be a high level voltage. In an n-type thin film transistor, a turn-on level voltage may be a high level voltage and a turn-off level voltage may be a low level voltage. The transistor may include a polysilicon semiconductor. In another embodiment, the transistor may include a single crystal silicon semiconductor, an oxide semiconductor, an amorphous silicon semiconductor, or the like.

Hereinafter, an embodiment in which one or more switching elements included in the pulse width control circuit PWMC is implemented as a p-type thin film transistor or an n-type thin film transistor will be described. However, the disclosure is not limited thereto.

Referring to FIG. 4, the pulse width control circuit PWMC according to an embodiment of the disclosure may include a first transistor TR1, a second transistor TR2, a third transistor TR3, a first capacitor Csw, and a second capacitor Chold.

The first transistor TR1 may switch an electrical connection between the data line DL and a first node N1. A gate electrode of the first transistor TR1 may be electrically connected to the first scan line SCL1. An operation timing of the first transistor TR1 may be controlled by a first scan signal SCAN1. Although the first transistor TR1 is shown as a p-type thin film transistor in FIG. 4, but the disclosure is not limited thereto, and the first transistor TR1 may be implemented as an n-type thin film transistor.

The second transistor TR2 may switch an electrical connection between the second power source line PL2 and a second node N2. A gate electrode of the second transistor TR2 may be electrically connected to the first node N1. An operation timing of the second transistor TR2 may be controlled according to a voltage of the first node N1. In case that the second transistor TR2 is turned on, the second power source voltage VINIT may be applied to the second node N2. Although the second transistor TR2 is shown as an n-type thin film transistor in FIG. 4, the disclosure is not limited thereto, and the second transistor TR2 may be implemented as a p-type thin film transistor.

The third transistor TR3 may switch an electrical connection between the first power source line PL1 and the second node N2. A gate electrode of the third transistor TR3 may be electrically connected to the second scan line SCL2. An operation timing of the third transistor TR3 may be controlled by a second scan signal SCAN2. In case that the third transistor TR3 is turned on, the first power source voltage ELVDD may be applied to the second node N2. Although the third transistor TR3 is shown as a p-type thin film transistor in FIG. 4, the disclosure is not limited thereto, and the third transistor TR3 may be implemented as an n-type thin film transistor.

The first capacitor Csw may include a first electrode E1 and a second electrode E2. The first electrode E1 of the first capacitor Csw may be electrically connected to the first node N1. A data voltage DATA_PWM may be input to the first electrode E1 of the first capacitor Csw. The second electrode E2 of the first capacitor Csw may be electrically connected to the sweep line SWL. A triangular wave SWEEP may be input to the second electrode E2 of the first capacitor Csw.

The first capacitor Csw may change a voltage of the first electrode E1 in case that the triangular wave SWEEP is input to the second electrode E2. In case that the triangular wave SWEEP is applied to the second electrode E2 in a state where a constant voltage is not applied to the first electrode E1 of the first capacitor Csw (or a floating state), a voltage level of the first electrode E1 may be changed. A phenomenon in which the voltage level of the first electrode E1 changes may be due to a coupling effect of a capacitor. The first capacitor Csw may also be referred to as a sweep capacitor.

The second capacitor Chold may include an electrode electrically connected to the second node N2 and another electrode to which a first power source voltage ELVDD is applied. The another electrode may be electrically connected to, for example, the first power source line PL1. The second capacitor Chold may remove noise generated in the second node N2.

The pulse width control circuit PWMC may output the second emission control signal EM2 through the second node N2. The high level voltage of the second emission control signal EM2 may be the first power source voltage ELVDD. The low level voltage of the second emission control signal EM2 may be the second power source voltage VINIT.

Figure 5:
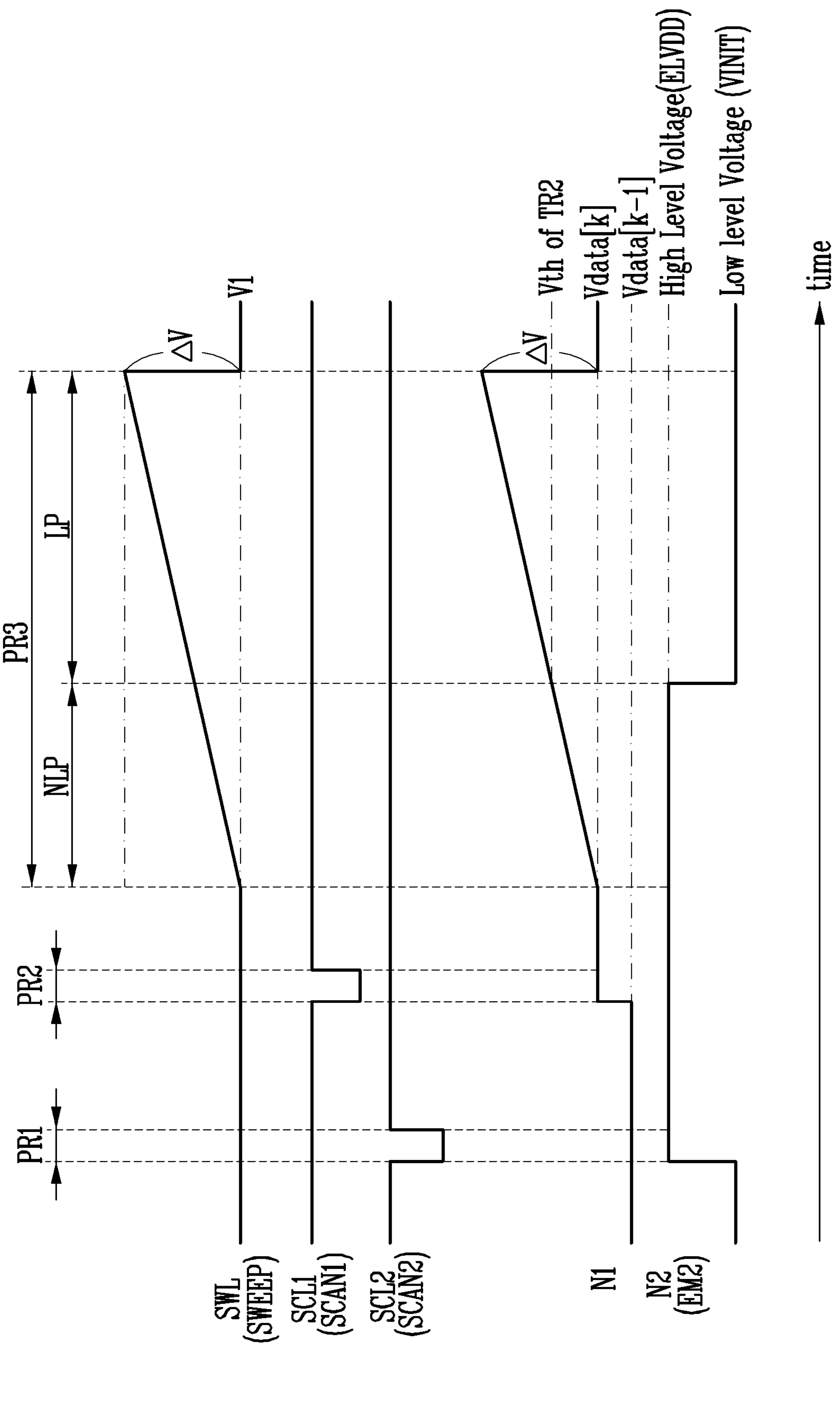
FIG. 5 is a schematic graph illustrating a second emission control signal generated by the pulse width control circuit according to an embodiment of the disclosure.

FIG. 5 is a schematic graph illustrating a second emission control signal EM2 generated by the pulse width control circuit PWMC according to an embodiment of the disclosure.

Referring to FIG. 5, a frame may include a first period PR1, a second period PR2, and a third period PR3.

The first period PR1 may be a period during which the second scan signal SCAN2 of a turn-on level is input to a pixel PXL (see, e.g., FIG. 1). In the first period PR1, the first scan signal SCAN1 of a turn-off level may be input to the pixel PXL. The first power source voltage ELVDD may be applied to the second node N2.

The second period PR2 may be a period during which the first scan signal SCAN1 of a turn-on level is input to the pixel PXL (see, e.g., FIG. 1). In the second period PR2, the second scan signal SCAN2 of a turn-off level may be input to the pixel PXL. A data voltage Vdata[k] (corresponding to DATA_PWM of FIG. 4) of a corresponding frame (for example, a k-th frame, where k may be a natural number greater than or equal to 2) may be input to the first node N1. For example, in the second period PR2, a data voltage Vdata[k−1] written in a previous frame period (for example, a (k−1)-th frame) may be erased, and the data voltage Vdata[k] of the corresponding frame may be written.

The third period PR3 may be a period in which the triangular wave SWEEP is input. In an embodiment of the disclosure, during the third period PR3, a voltage of the sweep line SWL may change (for example, increase) by a voltage ΔV (e.g., a predetermined or selectable voltage ΔV) from a first voltage V1 (e.g., a predetermined or selectable voltage V1).

Referring to FIG. 5, a section in which the voltage of the sweep line SWL linearly increases in the third period PR3 is shown only once, but the disclosure is not limited thereto. In another embodiment, the third period PR3 may include a section in which the voltage of the sweep line SWL linearly decreases.

In case that the voltage of the sweep line SWL increases or decreases linearly, the voltage of the first node N1 may be changed identically (or similarly) to the voltage of the sweep line SWL. A change in voltage at the first node N1 may be due to the above-described coupling effect.

Referring to FIG. 5, the third period PR3 may include a section in which a voltage level of the second node N2 is at a high level and a section in which the voltage level of the second node N2 is at a low level. One of the periods in which a voltage level of the second node N2 is at the high level and the section in which a voltage level of the second node N2 is at the low level may be an emission period LP, and another one may be a non-emission period NLP.

In case that the transistor of the pixel driving circuit PDC (see, e.g., FIG. 3) receiving the second emission control signal EM2 is a p-type transistor, the section in which the voltage level of the second node N2 is at the high level may be the non-emission period NLP, and the section in which the voltage level of the second node N2 is at the low level may be the emission period LP.

In case that the transistor of the pixel driving circuit PDC (see, e.g., FIG. 3) receiving the second emission control signal EM2 is an N-type transistor, the section in which the voltage level of the second node N2 is at the high level may be the emission period LP, and the section in which the voltage level of the second node N2 is at the low level may be the non-emission period NLP.

Hereinafter, it will be explained based on that the section in which the voltage level of the second node N2 is at the high level is the non-emission period NLP, and the section in which the voltage level of the second node N2 is at the low level is the emission period LP. However, the disclosure is not limited thereto.

A timing at which a voltage level of the first node N1 becomes higher than a threshold voltage Vth of the second transistor TR2 in the third period PR3 may vary according to a level of the data voltage Vdata[k]. Accordingly, a timing at which the second power source voltage VINIT is applied to the second node N2 may vary.

As described above, the pulse width control circuit PWMC (see, e.g., FIG. 4) may generate the second emission control signal EM2. The pulse width control circuit PWMC may adjust the pulse width of the second emission control signal EM2.

Figure 6:
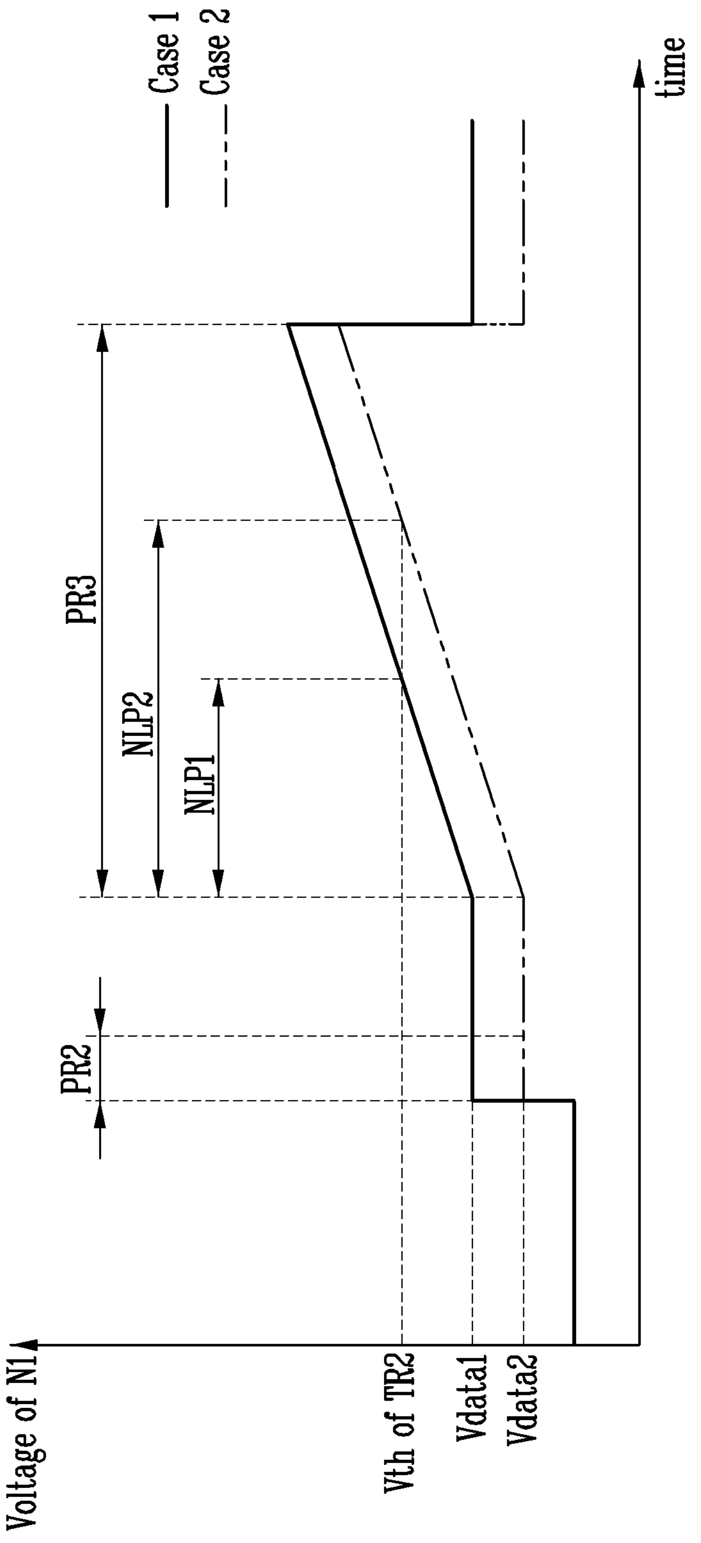
FIG. 6 is a schematic graph illustrating an embodiment in which a length of a non-emission period is adjusted according to a level of a data voltage.

FIG. 6 is a schematic graph illustrating an embodiment in which a length of a non-emission period NLP1 or NLP2 is adjusted according to the level of a data voltage Vdata1 or Vdata2. Two levels of data voltages Vdata1 and Vdata2 will be described.

In Case 1, in the second period PR2, a high level data voltage Vdata1 may be input to the first node N1. The voltage of the first node N1 may increase in the third period PR3, and at a time point, the voltage of the first node N1 may become greater than the threshold voltage Vth of the second transistor TR2. A period from the beginning of the third period PR3 to a point the voltage of the first node N1 reaches the threshold voltage Vth of the second transistor TR2 may be referred to as a first non-emission period NLP1.

In Case 2, in the second period PR2, a low level data voltage Vdata2 may be input to the first node N1. The voltage of the first node N1 may increase in the third period PR3, and at a time point, the voltage of the first node N1 may become greater than the threshold voltage Vth of the second transistor TR2. A period from the beginning of the third period PR3 to a point the voltage of the first node N1 reaches the threshold voltage Vth of the second transistor TR2 may be referred to as a second non-emission period NLP2.

Referring to FIG. 6, the first non-emission period NLP1 may be shorter than the second non-emission period NLP2. For example, in Case 1, a higher grayscale image may be displayed because the emission period is longer. In Case 2, a lower grayscale image may be displayed because the emission period is shorter.

According to an embodiment of the disclosure, images of different grayscales may be displayed according to a level of the data voltage.

Figure 7:
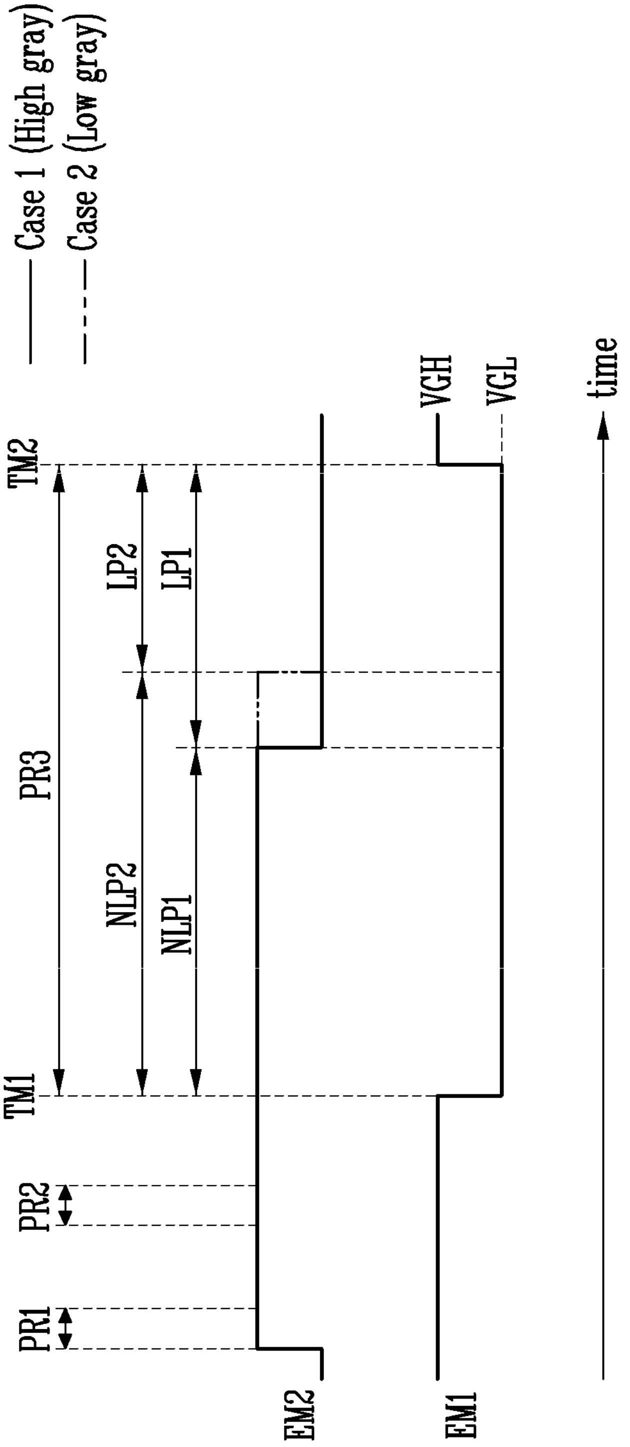
FIG. 7 is a schematic graph illustrating a relationship between a pulse width of the second emission control signal and a length of an emission period according to an embodiment of the disclosure.

FIG. 7 is a schematic graph illustrating a relationship between a pulse width of the second emission control signal EM2 and a length of an emission period LP1 or LP2 according to an embodiment of the disclosure.

In Case 1, the length of the non-emission period NLP1 may be relatively short, and the length of the emission period LP1 may be relatively long. Accordingly, in Case 1, a higher grayscale image may be displayed.

In Case 2, the length of the non-emission period NLP2 may be relatively long, and the length of the emission period LP2 may be relatively short. Accordingly, in Case 2, a lower grayscale image may be displayed.

Referring to FIG. 7, the first period PR1 and the second period PR2 may be a period in which a first emission control signal EM1 is a turn-off level voltage (for example, a high level gate voltage VGH), and the third period PR3 may be a period in which a first emission control signal EM1 is a turn-on level voltage (for example, a low level gate voltage VGL). The first emission control signal EM1 may be a signal input to the pixel driving circuit PDC (see, e.g., FIG. 3), which will be described in detail with reference to FIGS. 8 and 9.

A time point at which the third period PR3 starts and a time point TM1 at which the first emission control signal EM1 of a turn-on level is input may be the same. However, a margin period (e.g., a predetermined or selectable margin period) may be provided between the two time points (e.g., time point at which the third period PR3 starts and the time point TM1). A time point at which the third period PR3 ends and a time point TM2 at which the first emission control signal EM1 of a turn-off level is input may be the same. However, a margin period (e.g., a predetermined or selectable margin period) may be provided between the two time points (e.g., the time point at which the third period PR3 ends and the time point TM2).

Figure 8:
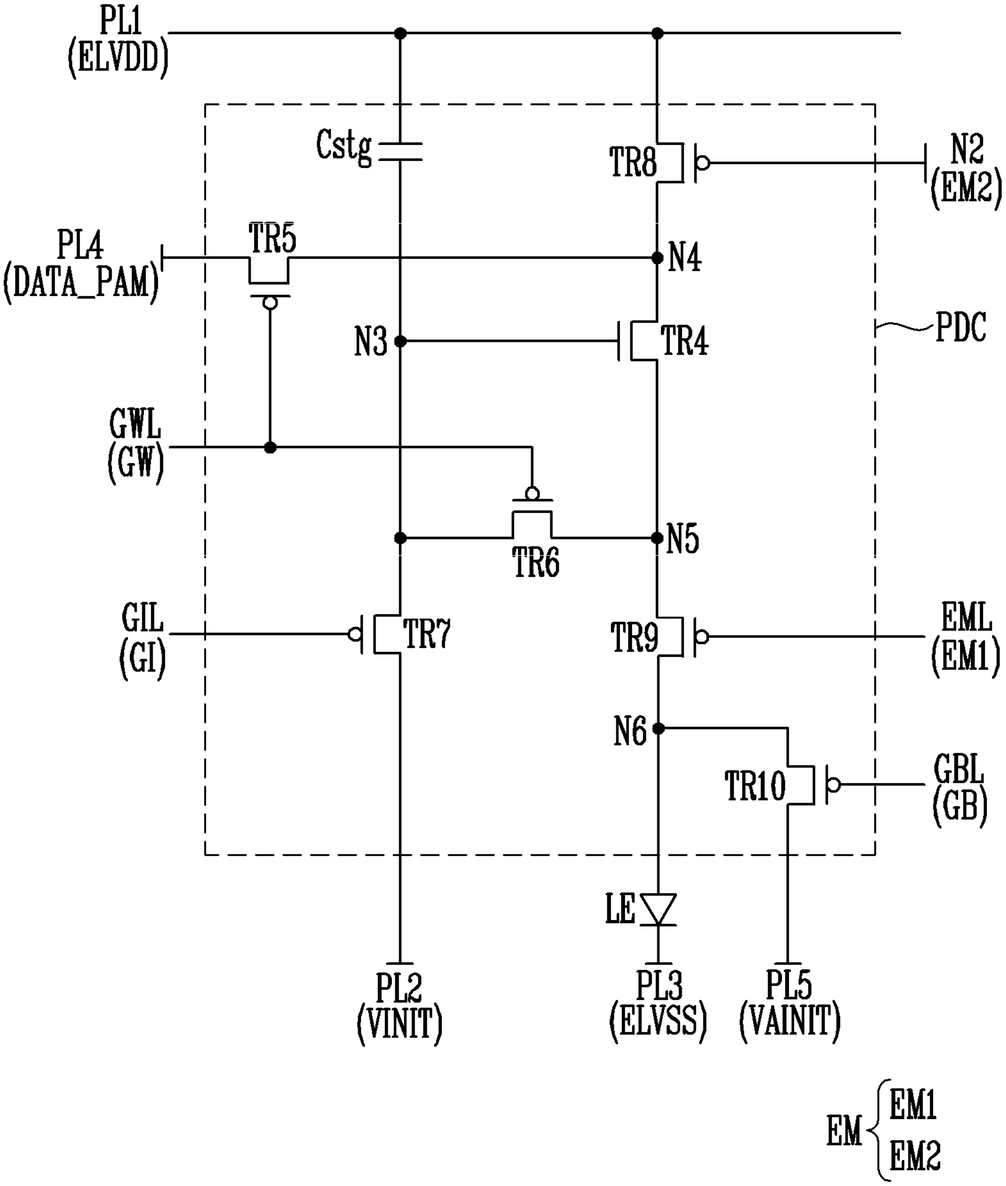
FIG. 8 is a schematic diagram illustrating an equivalent of a pixel driving circuit according to an embodiment of the disclosure.

FIG. 8 is a schematic diagram illustrating an equivalent of a pixel driving circuit PDC according to an embodiment of the disclosure.

The pixel driving circuit PDC according to an embodiment of the disclosure may be electrically connected to the light emitting element LE. The pixel driving circuit PDC may include a transistor electrically connected to the second node N2. The pixel driving circuit PDC may include one or more capacitors.

FIG. 8 illustrates that the pixel driving circuit PDC includes a fourth to tenth transistors TR4 to TR10 and a storage capacitor Cstg. However, the disclosure is not limited thereto.

The light emitting element LE may include a first electrode electrically connected to a sixth node N6 and a second electrode electrically connected to the third power source line PL3 to which the third power source voltage ELVSS is applied. The first electrode of the light emitting element LE may be one of an anode electrode and a cathode electrode, and the second electrode may be another one of the anode electrode and the cathode electrode.

In an embodiment of the disclosure, a length of a period in which the driving current flows through the light emitting element LE may be adjusted. A magnitude of the driving current flowing through the light emitting element LE may be constant regardless of the grayscale of an image displayed by a corresponding pixel PXL (see, e.g., FIG. 1).

The light emitting element LE may be an organic light emitting element including an organic light emitting layer. In another embodiment, the light emitting element LE may be an inorganic light emitting element including an inorganic material. In another embodiment, the light emitting element LE may be a light emitting element composed of a combination of an inorganic material and an organic material. In another embodiment, the light emitting element LE may have a form in which multiple inorganic light emitting elements are connected in parallel and/or in series between the third power source line PL3 and the sixth node N6.

The fourth transistor TR4 may switch an electrical connection between a fourth node N4 and a fifth node N5. A gate electrode of the fourth transistor TR4 may be electrically connected to a third node N3. One of a source electrode and a drain electrode of the fourth transistor TR4 may be electrically connected to the fourth node N4. Another one of the source electrode and the drain electrode of the fourth transistor TR4 may be electrically connected to the fifth node N5. The fourth transistor TR4 may function as a driving transistor supplying a driving current to the light emitting element LE.

The fifth transistor TR5 may switch an electrical connection between a fourth power source line PL4 and the fourth node N4. A gate electrode of the fifth transistor TR5 may be electrically connected to the third scan line GWL. An operation timing of the fifth transistor TR5 may be controlled by a third scan signal GW.

The fourth power source voltage DATA_PAM may be applied to the fourth power source line PL4. The fourth power source voltage DATA_PAM and the data voltage DATA_PWM or Vdata (see, e.g., FIG. 4) described above may be different in that the fourth power source voltage DATA_PAM may be commonly input to multiple pixels PXL.

The sixth transistor TR6 may switch an electrical connection between the third node N3 and the fifth node N5. A gate electrode of the sixth transistor TR6 may be electrically connected to the third scan line GWL. An operation timing of the sixth transistor TR6 may be controlled by the third scan signal GW. During a period in which the sixth transistor TR6 is turned on, the fourth transistor TR4 may be connected in a diode form.

The seventh transistor TR7 may switch an electrical connection between the second power source line PL2 and the third node N3. A gate electrode of the seventh transistor TR7 may be electrically connected to a fourth scan line GIL. An operation timing of the seventh transistor TR7 may be controlled by a fourth scan signal GI. During a period in which the seventh transistor TR7 is turned on, a voltage of the third node N3 may be initialized with the second power source voltage VINIT.

The eighth transistor TR8 may switch an electrical connection between the first power source line PL1 and the fourth node N4. A gate electrode of the eighth transistor TR8 may be electrically connected to the second node N2. In the disclosure, the eighth transistor TR8 may be referred to as a first emission control transistor.

Referring to FIG. 8, although the eighth transistor TR8 is shown as a p-type transistor, the disclosure is not limited thereto, and the eighth transistor TR8 may be implemented as an n-type transistor.

The ninth transistor TR9 may switch an electrical connection between the fifth node N5 and the sixth node N6. A gate electrode of the ninth transistor TR9 may be electrically connected to a first emission control line EML. An operation timing of the ninth transistor TR9 may be controlled by a first emission control signal EM1. During at least a part of a period during which the ninth transistor TR9 is turned on, the fourth transistor TR4 may be electrically connected to the light emitting element LE.

The tenth transistor TR10 may switch an electrical connection between the sixth node N6 and a fifth power source line PL5. A gate electrode of the tenth transistor TR10 may be electrically connected to a fifth scan line GBL. An operation timing of the tenth transistor TR10 may be controlled by a fifth scan signal GB. During a period in which the tenth transistor TR10 is turned on, a voltage of the sixth node N6 may be initialized with the fifth power source voltage VAINIT.

The storage capacitor Cstg may include an electrode electrically connected to the third node N3 and another electrode electrically connected to the first power source line PL1. The storage capacitor Cstg may apply a voltage corresponding to the fourth power source voltage DATA_PAM to the third node N3 for a frame.

FIG. 8 illustrates that only the fourth transistor TR4 is an n-type transistor and the fifth to tenth transistors TR5 to TR10 are p-type transistors. However, the disclosure is not limited thereto. In another embodiment, the fourth transistor TR4 may be implemented as a p-type transistor, and one or more of the fifth to tenth transistors TR5 to TR10 may be implemented as a n-type transistor.

Referring to FIG. 8, the emission control signal EM may include a first emission control signal EM1 and a second emission control signal EM2. In an embodiment of the disclosure, the driving current may be supplied to the light emitting element LE during at least a part of a period in which both the first emission control signal EM1 and the second emission control signal EM2 are at the turn-on level.

FIG. 8 illustrates that the second emission control signal EM2 is input to the gate electrode of the eighth transistor TR8 and the first emission control signal EM1 is input to the gate electrode of the ninth transistor TR9.

However, the disclosure is not limited to thereto, and the second emission control signal EM2 may be input to the gate electrode of the ninth transistor TR9, and the first emission control signal EM1 may be input to the gate electrode of the eighth transistor TR8.

Accordingly, as a pulse width of the second emission control signal EM2 is controlled, a period during which the driving current is supplied to the light emitting element LE may be controlled.

Figure 9:
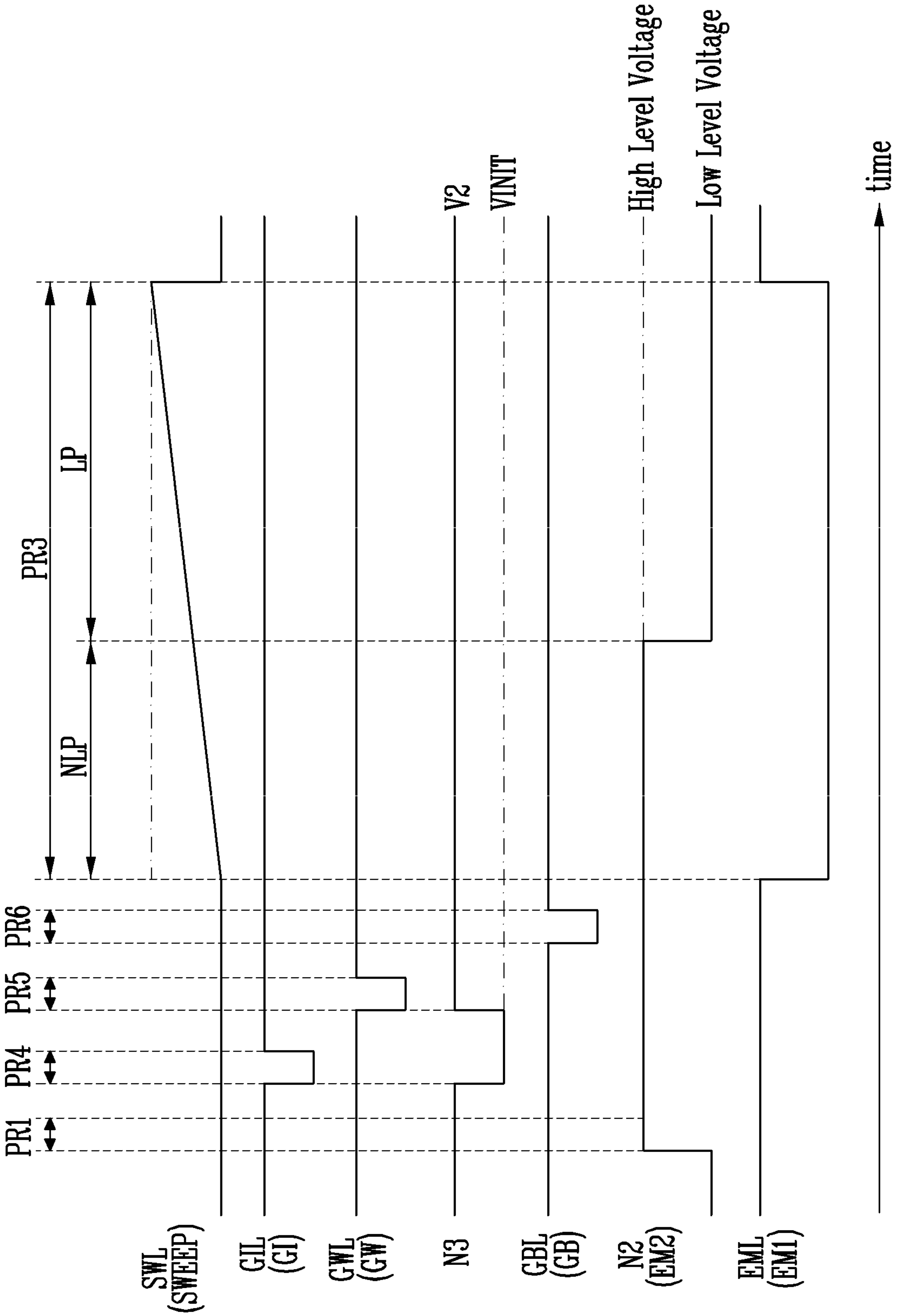
FIG. 9 is a schematic graph illustrating signals input to the pixel driving circuit and a voltage of a sweep line according to an embodiment of the disclosure.

FIG. 9 is a schematic graph illustrating signals input to the pixel driving circuit PDC (see, e.g., FIG. 8) and a voltage of a sweep line SWL according to an embodiment of the disclosure.

Referring to FIG. 9, a frame period may further include a fourth period PR4, a fifth period PR5, and a sixth period PR6 between the first period PR1 and the third period PR3.

In the first period PR1, the second emission control signal EM2 of the high level voltage may be input. The high level voltage of the second emission control signal EM2 may be a turn-off level voltage.

In the fourth period PR4, the fourth scan signal GI of the turn-on level may be input. The second power source voltage VINIT may be applied to the third node N3.

In the fifth period PR5, the third scan signal GW of the turn-on level may be input. As described above with reference to FIG. 8, the fifth transistor TR5 and the sixth transistor TR6 may be turned on. A second voltage V2 corresponding to the fourth power source voltage DATA_PAM (see, e.g., FIG. 8) may be input to the third node N3. The second voltage V2 may be a turn-on level voltage.

In the sixth period PR6, the fifth scan signal GB of the turn-on level may be input. As described above with reference to FIG. 8, the tenth transistor TR10 may be turned on, and a voltage of the sixth node N6 may be initialized with the fifth power source voltage VAINIT.

The second period PR2 (see, e.g., FIGS. 5, 6, and 7) may overlap one of the fourth period PR4, the fifth period PR5, and the sixth period PR6. However, the disclosure is not limited thereto, and the second period PR2 may not overlap the fourth period PR4, the fifth period PR5, and the sixth period PR6. The second period PR2 may exist between the first period PR1 and the fourth period PR4, between the fourth period PR4 and the fifth period PR5, between the fifth period PR5 and the sixth period PR6, or between the sixth period PR6 and the third period PR3.

In the third period PR3, the first emission control signal EM1 of the turn-on level may be input. As described above with reference to FIG. 8, the ninth transistor TR9 may be turned on.

Referring to FIG. 9, a time point at which the voltage of the sweep line SWL starts to increase linearly and a time point at which the first emission control signal EM1 of the turn-on level is input may be the same, but a margin period (e.g., a predetermined or selectable margin period) may be provided between the two time points (e.g., the time point at which the voltage of the sweep line SWL starts to increase linearly and the time point at which the first emission control signal EM1 of the turn-on level is input). Referring to FIG. 9, a time point at which the voltage of the sweep line SWL drops and a time point at which the first emission control signal EM1 of the turn-off level is input may be the same, but a margin period (e.g., a predetermined or selectable margin period) may be provided between the two time points (e.g., the time point at which the voltage of the sweep line SWL drops and the time point at which the first emission control signal EM1 of the turn-off level is input).

During the third period PR3, the second emission control signal EM2 of the turn-on level may be input. As described above with reference to FIG. 8, the eighth transistor TR8 may be turned on as the second emission control signal EM2 of the turn-on level is input. The driving current may be supplied to the light emitting element LE (see, e.g., FIG. 8) as the second emission control signal EM2 of the turn-on level is input.

Summarizing the above, it is as follows.

According to an embodiment of the disclosure, the period during which the light emitting element LE emits light may be controlled by controlling the pulse width of the second emission control signal EM2. Accordingly, the corresponding pixel PXL may display images of various grayscales from low grayscale to high grayscale.

According to an embodiment of the disclosure, images of various grayscales may be displayed without controlling the magnitude of the driving current. Accordingly, controlling the magnitude of the driving current within a fine range may be not necessary. According to an embodiment of the disclosure, a pixel PXL, a method for driving the same, and a display device 100 including the same can be provided that may alleviate a phenomenon in which color coordinates are distorted because characteristics (for example, threshold voltage, mobility, etc.) of a transistor (for example, the driving transistor of the pixel driving circuit PDC, etc.) positioned on a path by which a driving current flows are changed.

According to an embodiment of the disclosure, a pixel PXL displaying images of various grayscales by controlling the period in which a light emitting element LE emits light, a method for driving the same, and a display device 100 including the same may be provided.

The above description is an example of technical features of the disclosure, and those skilled in the art to which the disclosure pertains will be able to make various modifications and variations. Therefore, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A pixel comprising:

a light emitting element;

a pulse width control circuit that is electrically connected to a data line to which a data voltage is applied, generates an emission control signal having a pulse width depending on the data voltage, and outputs the emission control signal; and a pixel driving circuit that receives the emission control signal and supplies a driving current to the light emitting element for a period according to the pulse width of the emission control signal.

2. The pixel of claim 1, wherein the pulse width control circuit includes a first capacitor including a first electrode to which the data voltage is applied and a second electrode to which a triangular wave is applied.

3. The pixel of claim 2, wherein the pulse width control circuit further includes a first switching element that switches an electrical connection between the first electrode of the first capacitor and the data line.

4. The pixel of claim 3, wherein the pulse width control circuit further includes a second switching element including a gate electrode electrically connected to the first electrode of the first capacitor, a source electrode, and a drain electrode, the gate electrode of the second switching element is electrically connected to the first electrode of the first capacitor and the first switching element at a first node, one of the source electrode and the drain electrode of the second switching element is electrically connected to a first power source line to which a first power source voltage is applied, and another one of the source electrode and the drain electrode of the second switching element is electrically connected to a second power source line to which a second power source voltage is applied.

5. The pixel of claim 4, wherein the pulse width control circuit further includes a third switching element that switches an electrical connection between the first power source line and the second switching element.

6. The pixel of claim 5, wherein the second switching element and the third switching element are electrically connected at a second node, and the emission control signal is output through the second node.

7. The pixel of claim 6, wherein the pulse width control circuit further includes a second capacitor including an electrode electrically connected to the second node.

8. The pixel of claim 5, wherein the emission control signal has a high level voltage or a low level voltage, one of the high level voltage and the low level voltage is a voltage of the first power source line, and another one of the high level voltage and the low level voltage is a voltage of the second power source line.

9. The pixel of claim 4, wherein the light emitting element is electrically connected to a third power source line, the pixel driving circuit includes:

a first emission control switching element including a gate electrode to which the emission control signal is input and switching an electrical connection between the first power source line and a fourth node;

a fourth switching element including a gate electrode electrically connected to a third node, a source electrode, and a drain electrode; and a fifth switching element that switches an electrical connection between the fourth node and a fourth power source line, one of the source electrode and the drain electrode of the fourth switching element is electrically connected to the fourth node, and another one of the source electrode and the drain electrode of the fourth switching element is electrically connected to a fifth node.

10. The pixel of claim 9, wherein the pixel driving circuit further includes a second emission control switching element that switches an electrical connection between the fifth node and the light emitting element.

11. The pixel of claim 9, wherein the pixel driving circuit further includes a storage capacitor including an electrode electrically connected to the third node and another electrode electrically connected to the first power source line.

12. The pixel of claim 9, wherein the pixel driving circuit further includes a first initialization switching element that switches an electrical connection between the third node and a second power source line to which a second power source voltage is applied, and the gate electrode of the first emission control switching element is electrically connected to the second power source line through the pulse width control circuit.

13. The pixel of claim 1, wherein the driving current flowing through the light emitting element flows from a first power source line to which a first power source voltage is applied to the light emitting element via the pixel driving circuit, and a high level voltage of the emission control signal is a voltage applied from the first power source line to the pixel driving circuit via the pulse width control circuit.

14. A display device comprising:

a display panel on which a plurality of pixels including a light emitting element and a plurality of data lines electrically connected to the plurality of pixels are disposed; and a data driving circuit that supplies a data voltage having a voltage level corresponding to grayscale information to at least one data line of the plurality of data lines, wherein each of the plurality of pixels emits light for a period that varies in length according to the grayscale information; and each pixel comprising a pixel driving circuit that receives the emission control signal and supplies a driving current to the light emitting element for a period according to the pulse width of the emission control signal, wherein the emission control signal is dependent on the voltage level of a corresponding one of the connected data lines.

15. The display device of claim 14, further comprising:

a timing controller that outputs an input image data to the data driving circuit, wherein the input image data includes grayscale information for the each of the plurality of pixels, the data driving circuit outputs the data voltage having the voltage level corresponding to the grayscale information, and the each of the plurality of pixels emits light for a period that varies in length according to the grayscale information included in the input image data.

16. The display device of claim 14, wherein a plurality of first scan lines are disposed on the display panel, each of the plurality of first scan lines is electrically connected to ones of the plurality of pixels located in a same pixel row, and the ones of the plurality of pixels located in the same pixel row have different start timings or different end timings of emitting light depending on the data voltage.

17. The display device of claim 14, further comprising:

a triangular wave output circuit outputting a first voltage or a triangular wave that increases linearly from the first voltage, wherein at least one sweep line to which the triangular wave is applied is disposed on the display panel, the at least one sweep line is electrically connected to the plurality of pixels, a period during which the data voltage is input to the plurality of pixels electrically connected to the at least one sweep line overlaps a period during which the triangular wave output circuit outputs the first voltage, and a period during which the plurality of pixels electrically connected to the at least one sweep line emit light overlaps a period during which the triangular wave output circuit outputs the triangular wave.

18. An electronic device comprising:

a display panel including a pixel to display an image according to an image data; and a host system to output the image data, wherein the pixel comprising:

a light emitting element;

a pulse width control circuit that is electrically connected to a data line to which a data voltage is applied, generates an emission control signal having a pulse width depending on the data voltage, and outputs the emission control signal; and a pixel driving circuit that receives the emission control signal and supplies a driving current to the light emitting element for a period according to the pulse width of the emission control signal.

* * * * *